US012529260B2

(12) United States Patent
Guo

(10) Patent No.: US 12,529,260 B2
(45) Date of Patent: Jan. 20, 2026

(54) SIDE-OPEN SAFETY DOOR RAILING

(71) Applicant: Guangzhou Sair Industrial Co., Ltd, Guangzhou (CN)

(72) Inventor: Jiye Guo, Guangzhou (CN)

(73) Assignee: Guangzhou Sair Industrial Co., Ltd, Guangzhou (CN)

( * ) Notice: Subject to any disclaimer, the term of this patent is extended or adjusted under 35 U.S.C. 154(b) by 0 days.

(21) Appl. No.: 18/814,703

(22) Filed: Aug. 26, 2024

(65) Prior Publication Data

US 2025/0354435 A1 Nov. 20, 2025

(30) Foreign Application Priority Data

May 14, 2024 (CN) ........................ 202421049712.8

(51) Int. Cl.
*E06B 9/04* (2006.01)
*E06B 9/06* (2006.01)
*E06B 9/00* (2006.01)

(52) U.S. Cl.
CPC .................. *E06B 9/04* (2013.01); *E06B 9/06* (2013.01); *E06B 2009/002* (2013.01)

(58) Field of Classification Search
CPC ........ E06B 2009/002; E06B 9/02; E06B 9/04; E06B 9/06
See application file for complete search history.

(56) References Cited

U.S. PATENT DOCUMENTS

| | | | | |
|---|---|---|---|---|
| 4,702,036 A * | 10/1987 | Johnson | E06B 9/04 | 49/55 |
| 4,884,614 A * | 12/1989 | Spurling | E06B 9/04 | 49/55 |
| 5,272,840 A * | 12/1993 | Knoedler | E06B 9/04 | 49/55 |
| 5,797,218 A * | 8/1998 | Holland | E06B 9/04 | 49/55 |
| 6,016,629 A * | 1/2000 | Sylvester | E05D 7/12 | 49/55 |
| 6,112,460 A * | 9/2000 | Wagnitz | E06B 9/04 | 49/55 |
| 7,963,575 B2 * | 6/2011 | Mayo | E06B 9/04 | 49/57 |
| 8,713,851 B2 * | 5/2014 | Flannery | E06B 11/022 | 49/55 |
| 9,328,551 B2 * | 5/2016 | Henderson | E06B 9/04 | |
| 10,081,980 B2 * | 9/2018 | Birkert | E06B 9/04 | |
| 10,550,634 B1 * | 2/2020 | Holland | E06B 9/06 | |

(Continued)

*Primary Examiner* — Justin B Rephann
(74) *Attorney, Agent, or Firm* — JEEN IP LAW, LLC

(57) ABSTRACT

The present invention discloses a side-open safety door railing and, during installation, two positioning mechanisms are first fixed opposite to each other at an interval in the installation position and, according to the distance between the two positioning mechanisms, one of the two door bodies is adjusted to move horizontally relative to the other, thereby increasing or decreasing the length, so that each side of the two door bodies can be detachably pivoted with the two positioning mechanisms, and after one of the two sides of the pivot fit is released, the door body can swing to implement the opening and closing action, with the unreleased pivot fit on the other side as the rotation center, so that users can choose to open the door from the left or right side as needed.

13 Claims, 6 Drawing Sheets

(56) References Cited

U.S. PATENT DOCUMENTS

| | | | | |
|---|---|---|---|---|
| 10,907,382 | B2 * | 2/2021 | Raffi | E05B 59/00 |
| 10,975,621 | B2 * | 4/2021 | Gentil | E05B 65/0007 |
| 11,015,386 | B2 * | 5/2021 | Wang | E05B 63/0008 |
| 11,639,630 | B1 * | 5/2023 | Flannery | E06B 9/06 160/130 |
| 2014/0007506 | A1 * | 1/2014 | Huang | E06B 3/32 49/394 |
| 2015/0101250 | A1 * | 4/2015 | Marsden | E06B 9/0623 49/55 |
| 2015/0330142 | A1 * | 11/2015 | Pilgrim | E05D 3/02 160/374 |
| 2018/0112457 | A1 * | 4/2018 | Raffi | E05C 19/06 |
| 2018/0274288 | A1 * | 9/2018 | Wang | E06B 9/04 |
| 2023/0349214 | A1 * | 11/2023 | Marsden | E05D 15/581 |

* cited by examiner

SIDE-OPEN SAFETY DOOR RAILING

CROSS-REFERENCE TO RELATED APPLICATIONS

This application claims priority to Chinese Patent Application No. 202421049712.8, filed on May 14, 2024, which is hereby incorporated by reference in its entirety.

TECHNICAL FIELD

The present invention relates to the field of protective door railing, particularly to a side-open safety door railing.

BACKGROUND

In families with infants, in order to protect infants walking out of the room against accidents such as getting lost or personal injury, people often install a sliding door railing in positions like indoor corridors, and the sliding door railing is mainly composed of two movably connected door bodies, one of the door bodies can be slid to make lengthen or shorten the door railing; during installation, the length of door railing can be adjusted according to the length of the aisle first, and then one side of the door railing can be rotatably installed at the installation position, so that the door railing can swing between the position where the aisle is disconnected and the position where the aisle is opened, and when the door railing swings to the position where the aisle is disconnected, the other side of the door railing can be locked by the door railing lock. This type of sliding door railing is opened on a single side because the pivot structure on one side is used for swinging the door railing and the locking structure on the other side used for fixing the door railing, and consumers are rarely attracted by and interested in such sliding door railings with a stereotyped structure and operation mode.

SUMMARY

The main purpose of the present invention is to propose a side-open safety door railing to address the problems raised in the background art mentioned above.

In order to achieve the above purpose, the present invention proposes a side-open safety door railing, including two door bodies 100 that are movably connected to each other, and one of the two door bodies 100 can perform linear reciprocating motion in the horizontal direction relative to the other, so that the two door bodies 100 overlap or are staggered, and one side of the door body 100 is detachably and rotatably connected with a positioning mechanism 200 for fixation in the assembly position, so that the door body 100 can swing horizontally relative to the assembly position to open or close the door.

In the technical solution of the present invention, during installation, two positioning mechanisms are first fixed with an interval opposite to each other in the installation position and, according to the distance between the two positioning mechanisms, one of the two door bodies is adjusted to move horizontally relative to the other, thereby increasing or decreasing the length, so that each side of the two door bodies can be detachably pivoted with the two positioning mechanisms, and after one of the two sides of the pivot fit is released, the door body can swing to implement the opening and closing action, with the unreleased pivot fit on the other side as the rotation center, so that users can choose to open the door from the left or right side as needed. Compared with traditional ones, the side-open safety door railing has a simple structure as whole and demonstrates excellent practicality and novelty, and when necessary, the pivot fit on both sides can be simultaneously released to quickly remove the door body.

DETAILED DESCRIPTION OF THE EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

The present invention proposes a side-open safety door railing.

Figure 1:
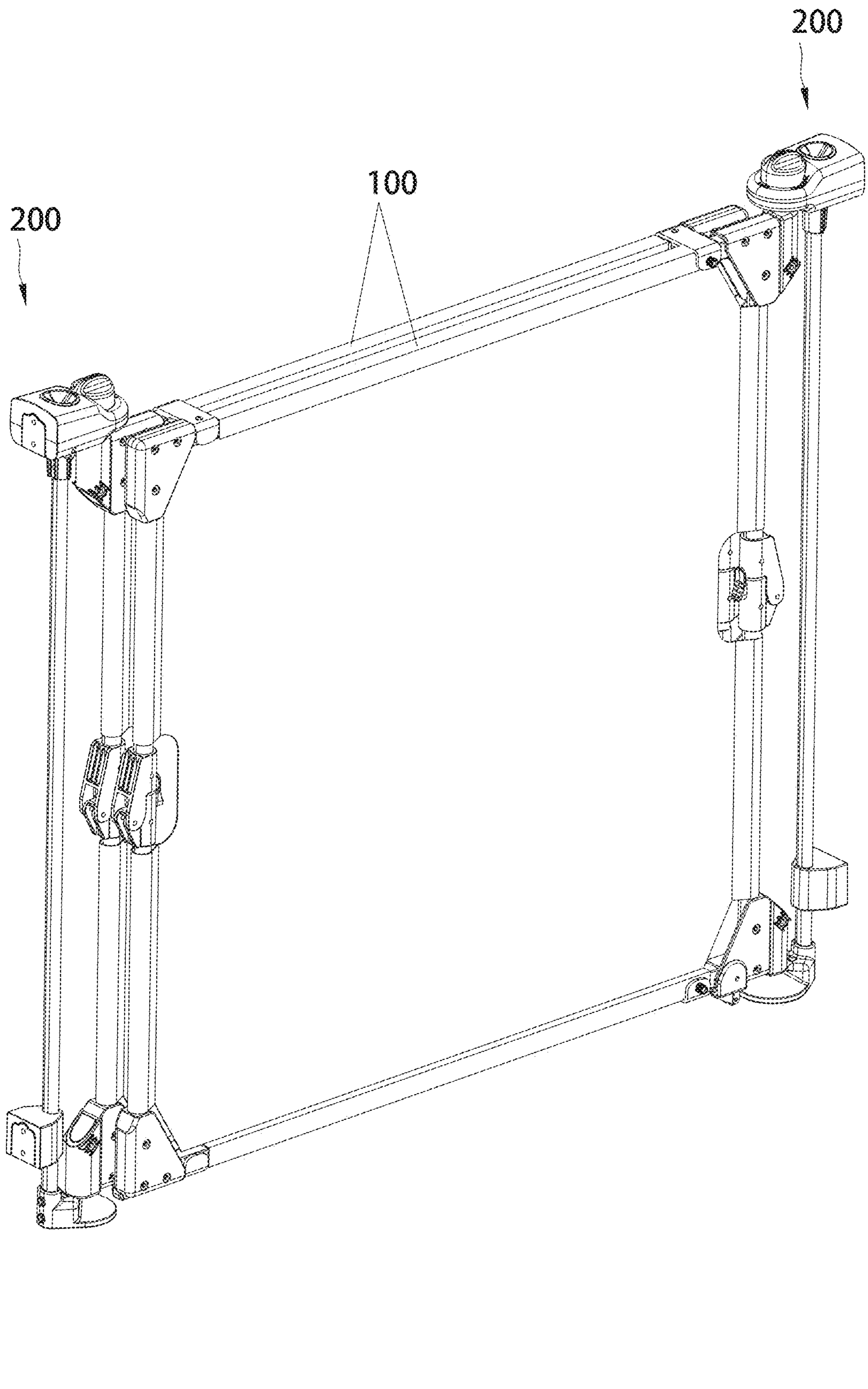
FIG. 1 is a stereoscopic view of the present invention.
Figure 2:
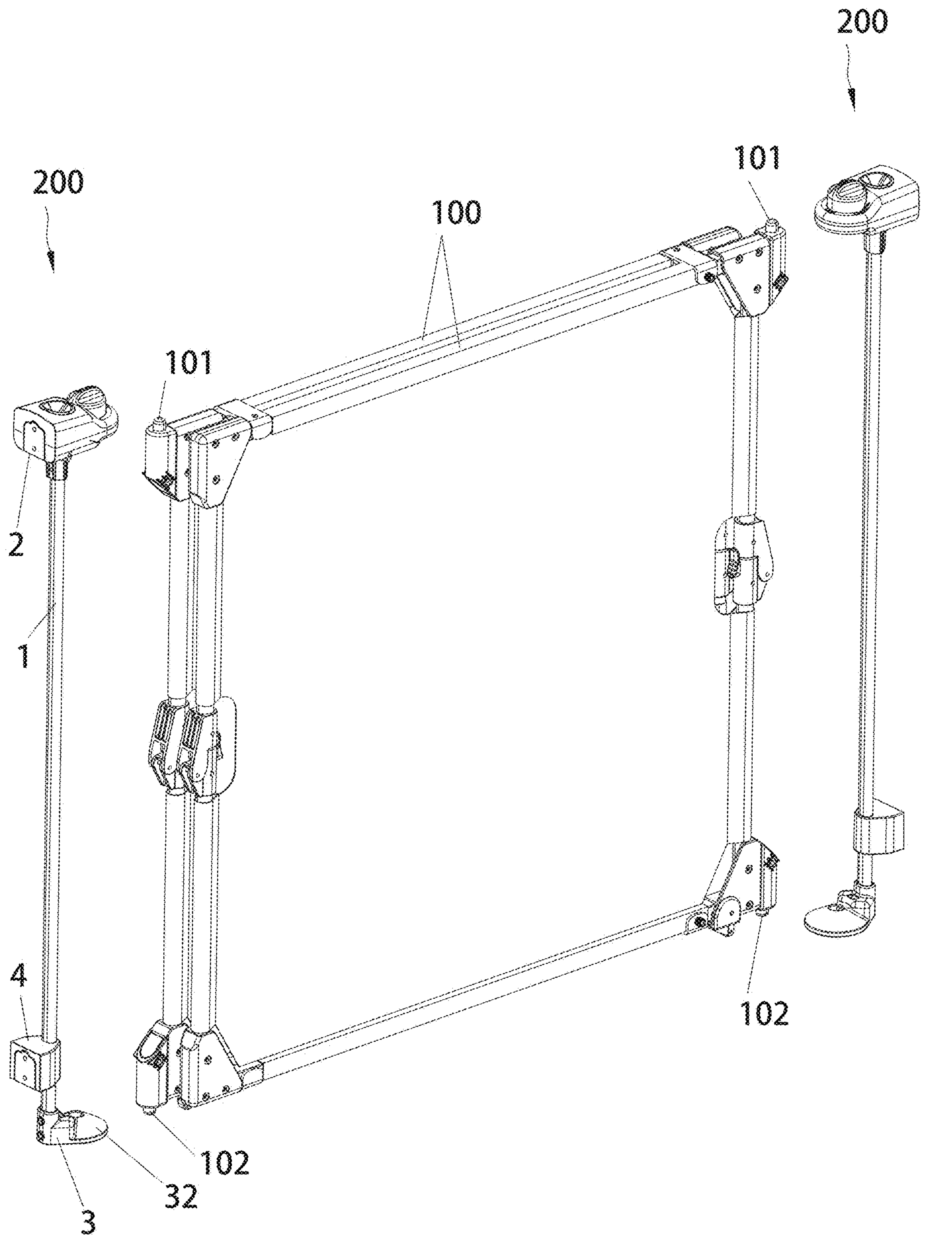
FIG. 2 is a stereoscopic view of the positioning mechanism and door body.
Figure 3:
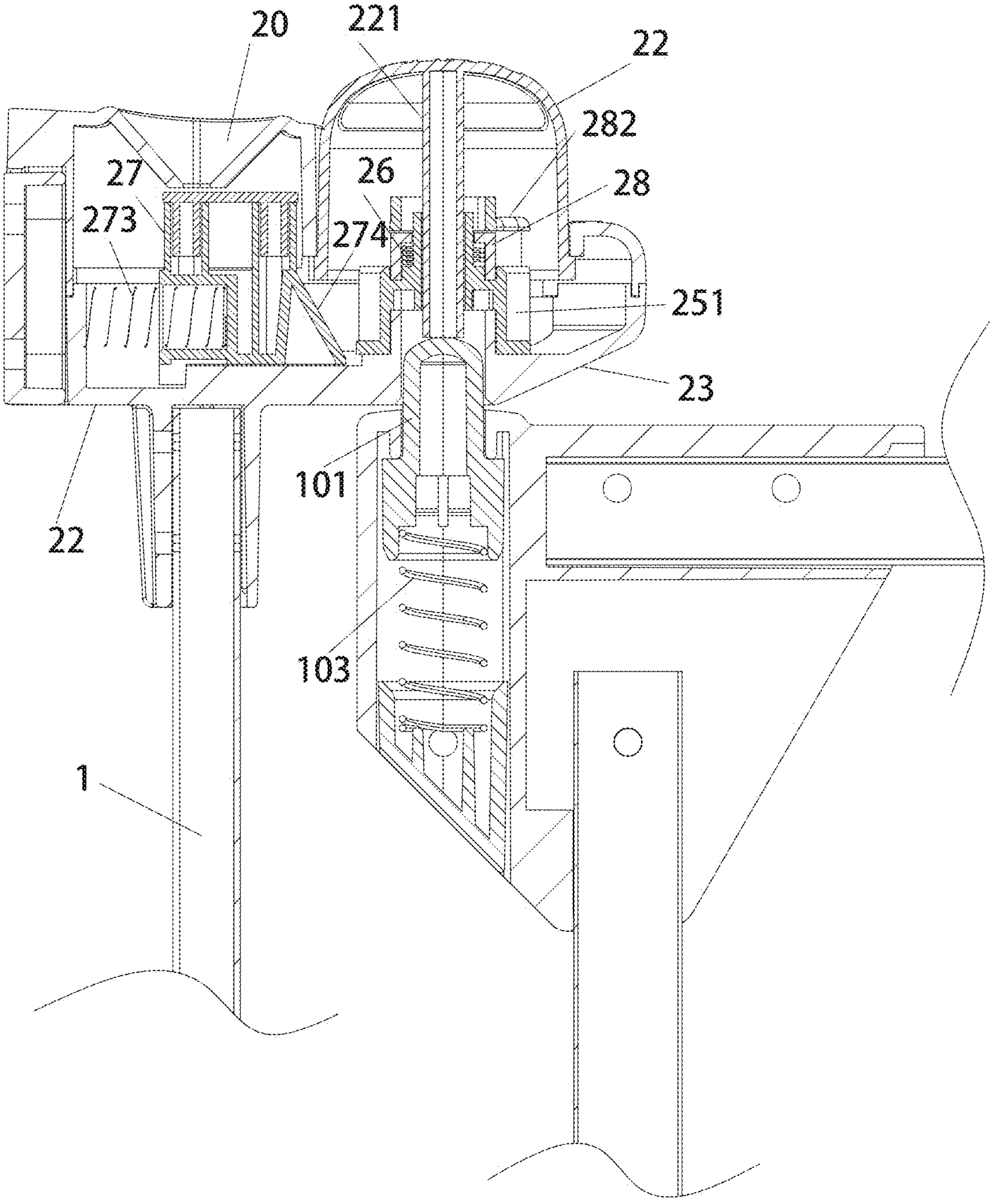
FIG. 3 is a cutaway view of the assembly between upper seat and door body.
Figure 4:
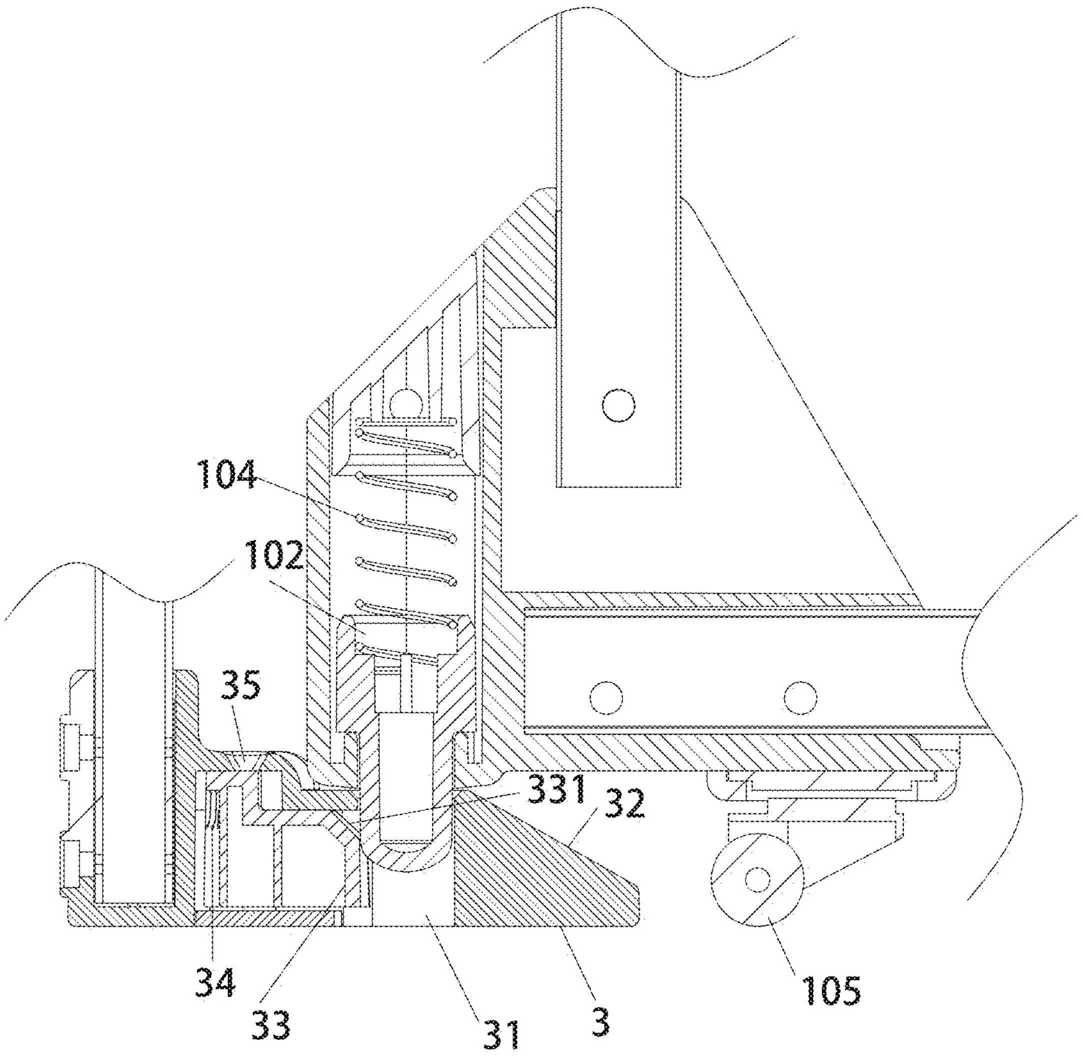
FIG. 4 is a cutaway view of the assembly between the lower seat and the bottom of door body.
Figure 5:
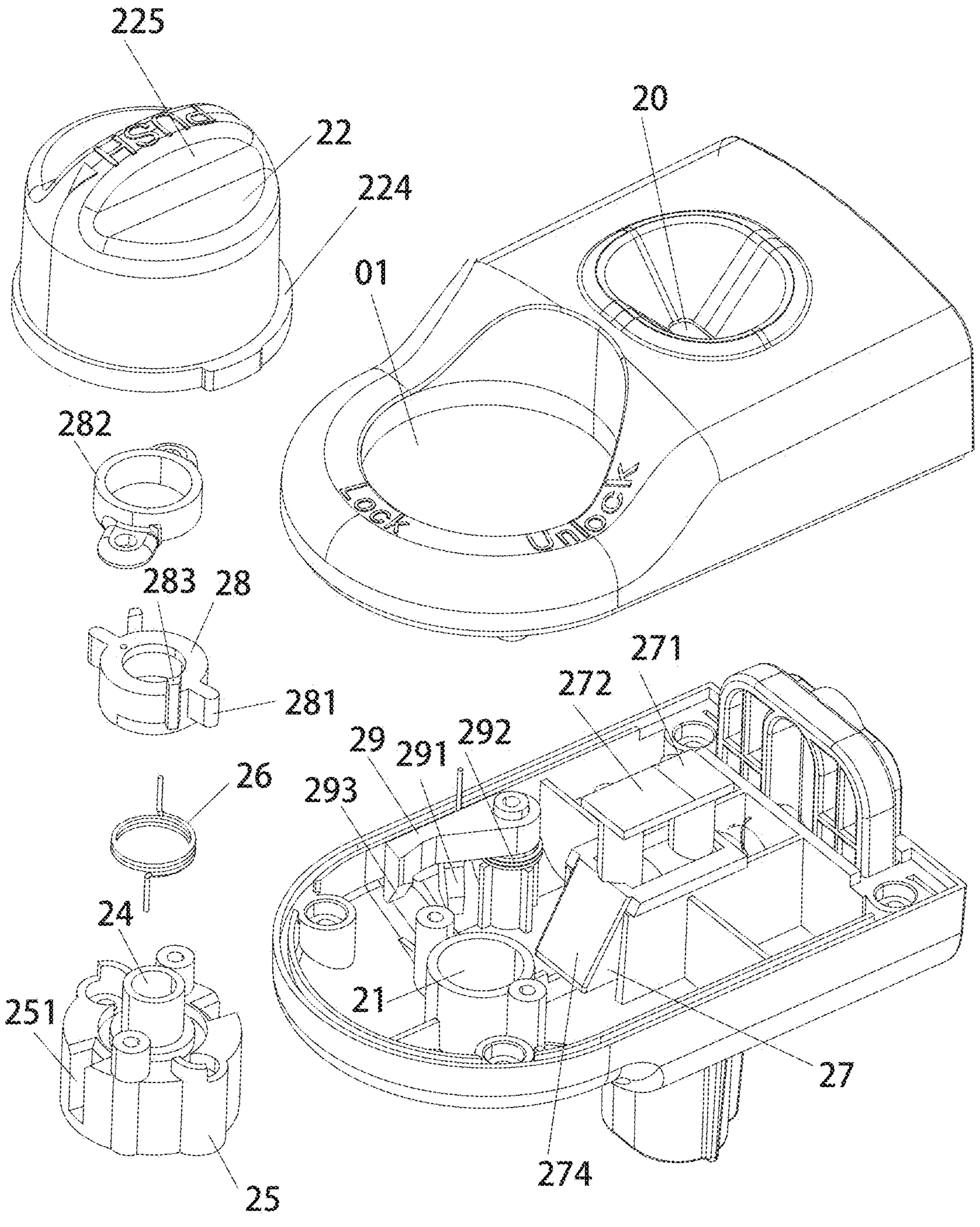
FIG. 5 is an exploded view of the upper seat.
Figure 6:
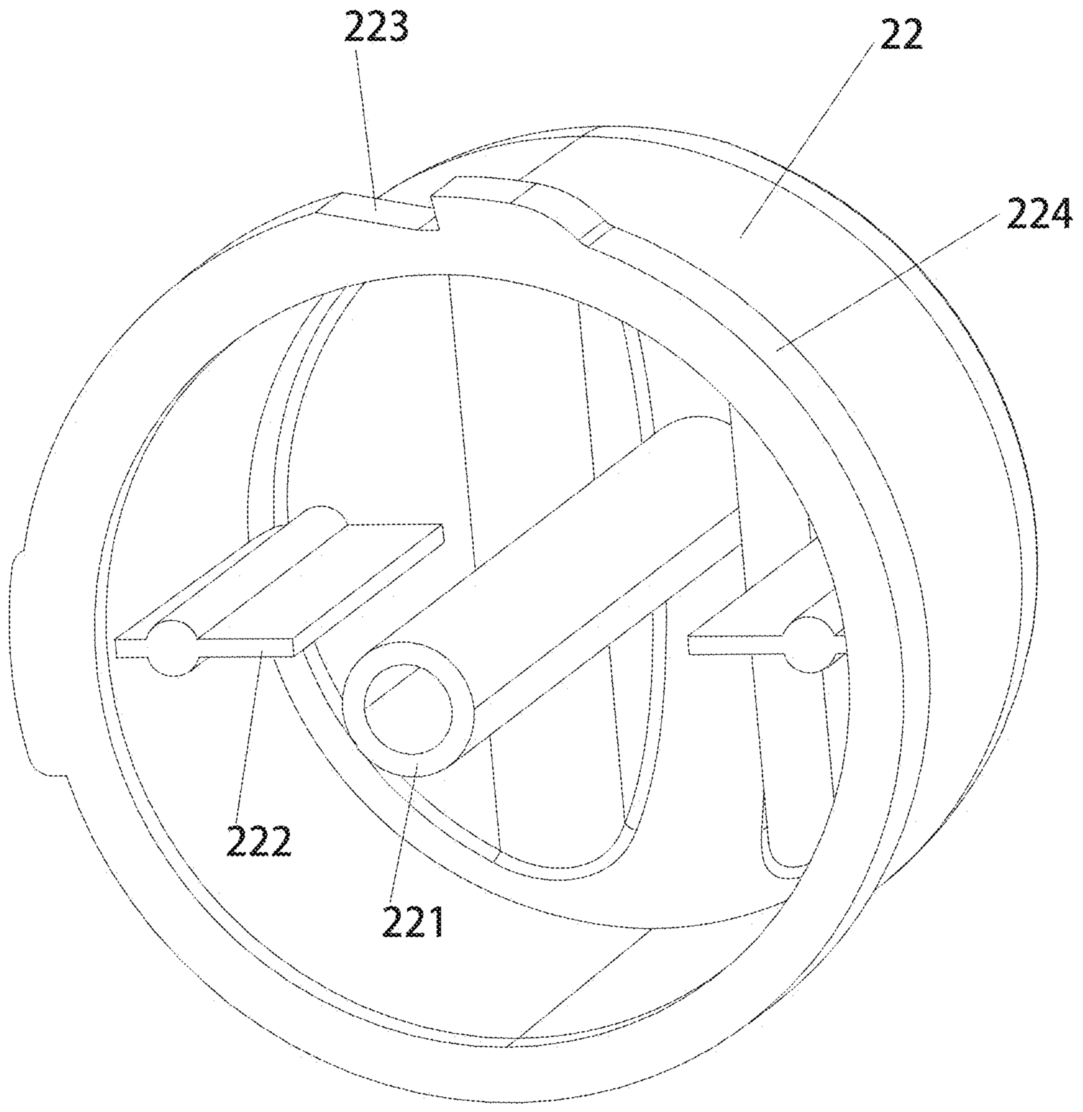
FIG. 6 is a schematic diagram of the unlocking member.

In the embodiment of the present invention, as shown in FIGS. 1 to 6, the side-open safety door railing includes two door bodies 100 that are movably connected to each other, and one of the two door bodies 100 can perform linear reciprocating motion in the horizontal direction relative to the other, so that the two door bodies 100 overlap or are staggered, and one side of the door body 100 is detachably and rotatably connected with a positioning mechanism 200 for fixation in the assembly position, so that the door body 100 can swing horizontally relative to the assembly position to open or close the door.

In the technical solution of the present invention, during installation, two positioning mechanisms are first fixed with an interval opposite to each other in the installation position and, according to the distance between the two positioning mechanisms, one of the two door bodies is adjusted to move horizontally relative to the other, thereby increasing or decreasing the length, so that each side of the two door bodies can be detachably pivoted with the two positioning mechanisms, and after one of the two sides of the pivot fit is released, the door body can swing to implement the opening and closing action, with the unreleased pivot fit on the other side as the rotation center, so that users can choose to open the door from the left or right side as needed. Compared with traditional ones, the side-open safety door railing has a simple structure as whole and demonstrates excellent practicality and novelty, and when necessary, the pivot fit on both sides can be simultaneously released to quickly remove the door body.

It should be noted that reference can be made to the prior art for the mutual movable connection structure between the two door bodies 100, and its specific structural principles will not longer be elaborated here.

Specifically, the positioning mechanism 200 includes a support rod 1, and upper seat 2 and and lower seat 3 that are respectively disposed at both ends of the support rod 1, and the upper and lower seats 2 and 3 are detachably pivoted with the top and bottom of the door body 100, respectively.

Specifically, the bottom of upper seat 2 and the top of lower seat 3 are provided with a first connection hole 21 and a second connection hole 31, respectively, and the top and bottom of the door body 100 are respectively provided with a first connecting piece 101 for movable insertion with the first connection hole 21 and a second connecting piece 102 for movable insertion with the second connection hole 31, and the first connecting piece 101 can, relative to the door body 100, move between the position where it inserts into the first connection hole 21 and the position where it withdraws from the first connection hole 21, and an unlocking member 22 is also provided to drive the first connecting piece 101 to withdraw from the first connection hole 21 to disengage the upper seat 2 from the top of the door body 100.

During door opening, after the first connecting piece 101 is driven out of the first connection hole 21 by the unlocking member 22, and the top of door body 100 is disconnected from the upper seat 2, the door body 100 can be moved to keep the first connecting piece 101 away from the first connection hole 21; the incomplete tight fit between the door body 100 and the positioning mechanism 200 enables to slightly lift the door body 100 to pull the second connecting piece 102 out of the second connection hole 31, disassembling the door body 100 from the positioning mechanism 200, that is, unlocking the safety door railing. In this embodiment, the two door bodies 100 have the same structure, and the two positioning mechanisms 200 also have the same structure, so the safety door railing can be unlocked to open on both sides.

Specifically, in one embodiment, the first connecting piece 101 is connected to the unlocking member 22, and the unlocking member 22 drives the first connecting piece 101 to move into or out of the first connection hole 21. In this embodiment, however, a first top spring 103 is further provided to apply elastic force to the first connecting piece 101 in the direction in which the first connecting piece 101 inserts into the first connection hole 21. During door closing, the first connecting piece 101 can be forced by external force to move away from the first connection hole 21, compressing the first top spring 103 until the first connecting piece 101 is aligned with the first connection hole 21 and, after the first top spring 103 decompresses to release elastic force, a part of the first connecting piece 101 automatically extends into the first connection hole 21.

Specifically, in the embodiment, the bottom of the upper seat 2 is provided with a first guide surface 23 for contacting the top of the first connecting piece 101. When the door body 100 swings in the direction in which the door is closed, the first guide surface 23 will contact the top of the first connecting piece 101, and guide the first connecting piece 101 to move away from the first connection hole 21 during the further swinging process of the door body 100 to compress the first top spring 103.

Specifically, the second connecting piece 102 can, relative to the door body 100, move between the position where it inserts into the second connection hole 31 and the position where it withdraws from the second connection hole 31, and a second top spring 104 is also provided to apply elastic force to the second connecting piece 102 in the direction in which the second connecting piece 102 inserts into the second connection hole 31. During door closing, the second connecting piece 102 can be forced by external force to move away from the second connection hole 31, compressing the second top spring 103 until the second connecting piece 102 is aligned with the second connection hole 31 and, after the second top spring 104 decompresses to release elastic force, a part of the second connecting piece 102 automatically extends into the second connection hole 31.

Specifically, in the embodiment, the bottom of the lower seat 3 is provided with a second guide surface 32 for contacting the top of the second connecting piece 102. When the door body 100 swings in the direction in which the door is closed, the second guide surface 32 will contact the top of the second connecting piece 102, and guide the second connecting piece 102 to move away from the second connection hole 31 during the further swinging process of the door body 100 to compress the second top spring 104.

Specifically, a movable block (33) is movably provided inside the lower seat (3), and the movable block (33) can move between the position where it partially extends into the second connection hole (31) and the position where it withdraws from the second connection hole (31), and a third top spring (34) is additionally provided to apply elastic force to the movable block (33) to move in the direction in which the movable block (33) partially extends into the second connection hole (31), the lower end of the second connecting piece (102) is spherical, and the movable block (33) is provided with a third guide surface (331) for contact with the spherical surface. When the second top spring 104 releases elastic force to cause the lower end of the second connecting piece 102 to spring into the second connection hole 31, the fit between the third guide surface 331 and the spherical surface forces the moving block 33 to move a certain position in the direction in which the moving block 33 withdraws from the second connection hole 31, and the elastic force applied by the second top spring 104 and the third top spring 34 can keep the moving block 33 in contact with the peripheral wall of the second connecting piece 102; when the first connecting piece 101 is away from the first connection hole 21, the second connecting piece 102 will tilt to a certain extent, causing the spherical surface to contact with the third guide surface 331 and, at the same time, the elastic force applied by the third top spring 34 can force the second connecting piece 102 to move away from the second connecting piece 102; the elastic force applied by the third top spring 34, of course, cannot completely withdraw the second connecting piece 102 from the second connection hole 31, and the fit between the opening of the second connection hole 31 and the spherical surface is also required when the door body 100 swings under external force, that is, the fit between the lower seat 3 and the bottom of door body 100 is released, without lifting the lower part of door body 100 to pull the second connecting piece 102 out of the second connection hole 31.

Specifically, the top wall of the moving block 33 is provided with a first mark (not shown in the figure) indicating the locked state and a second mark (not shown in the figure) indicating the unlocked state, a first window 35 is provided at a position on the lower seat 3 above the moving block 33, the moving block 33 can move between the position where the first mark aligns with the first window 35 and the position where the second mark aligns with the first window 35 and, when the first mark is aligned with the first window 35, the moving block 33 is elastically pressed against the peripheral wall of the second connecting piece 102, and the second top spring 104 can apply elastic force to the moving block 33 in the direction in which the second mark aligns with the first window 35.

Specifically, there are a variety of ways to fix the positioning mechanism 200 to the assembly position, for example, locking the support rod 1, upper seat 2, and lower seat 3 to the assembly position with screws; the assembly position is usually a wall, and some walls have skirting lines, and in order to avoid the skirting lines and prevent the support rod 1 from tilting, in this embodiment, the positioning mechanism 200 also includes a sliding seat 4 that is movably sleeved on the support rod 1, and the sliding seat 4 is used to fixedly connect with the assembly position to achieve the connection between the positioning mechanism 200 and the assembly position.

Specifically, the sliding seat 4 and the upper seat 2 can be fixed to the wall by screws or quick release structures, so that the support rod 1 can avoid the skirting line and prevent the positioning mechanism 200 from tilting.

It should be noted that reference can be made to the prior art for the quick release mechanism, and its specific structural principles will not longer be elaborated here.

Specifically, the unlocking member 22 has a plurality of embodiments and in this embodiment, the upper seat 2 is internally provided with a socket 24 that aligns vertically with the first connection hole 21, and the unlocking member 22 is provided with a connection shaft 221 for movable insertion with the socket 24, the unlocking member 22 is rotatably installed on the upper seat 2 through the fit between the connection shaft 221 and the socket 24 and can perform vertical reciprocating motion along the socket 24 and, the unlocking member 22, during the downward movement, can contact the first connecting piece 101 through the connection shaft 221 and drive the first connecting piece 101 to move in the direction in which the first connecting piece 101 withdraws from the first connection hole 21, forcing the first connecting piece 101 to withdraw from the first connection hole 21.

Specifically, the upper seat 2 is internally provided with a base 25 having an insertion hole 24, the unlocking member 22 has a limiting portion 222, the base 25 has a limiting groove 251, and the limiting portion 222 can, with the pivot of unlocking member 22, swing between the position where it is aligned vertically with the limiting groove 251 and the position where it is away from the limiting groove 251 and when the limiting portion 222 is aligned with the limiting groove 251, the unlocking member 22 can drive the limiting portion 222 to insert into the limiting groove 251 while driving the first connecting piece 101 downwards to withdraw from the first connection hole 21, and a first torsion spring 26 is also provided to apply elastic force to the unlocking member (22) to pivot in the direction in which the limit portion 222 is away from the limiting groove 251. When the limiting portion 222 is inserted into the limiting groove 251, the limiting portion 222 is kept in contact with the inner wall of the limiting groove 251 under the elastic force applied by the first torsion spring 26, and when the elastic force applied by the first top spring 103 causes the first connecting piece 101 partially insert into the first connecting hole 21, the unlocking member 22 is lifted by the connecting shaft 221 to drive the limiting portion 222 to withdraw from the limiting groove 251 and, after the limiting portion 222 withdraws from the limiting groove 251, the elastic force applied by the first torsion spring 26 forces the unlocking member 22 to drive the limiting portion 222 to swing to a position away from the limiting groove 251, thus automatic resetting the unlocking member 22.

Specifically, a sliding block 27 is movably installed inside the upper seat 2, the top of the sliding block 27 is provided with a third mark 271 indicating the locked state and a fourth mark 272 indicating the unlocked state, the top of the upper seat 2 is provided with a second window 20, and the sliding block 27 can move between the position where the third mark 271 aligns with the second window 20 vertically and the position where the fourth mark 272 aligns with the second window 20 vertically; a fourth top spring 273 is additionally provided to apply elastic force to the sliding block 27 to move in the direction in which the third mark 271 aligns with the second window 20 vertically, the side of the sliding block 27 near the base 25 is provided with a fourth guide surface 274 and, during the downward movement, the unlocking member 22 maintains a partial contact with the fourth guide surface 274, and the sliding block 27 is forced by the fourth guide surface 274 to move in the direction in which the fourth mark 272 aligns with the second window 20 vertically, and the fourth top spring 273 is then compressed, so that after the top of the door body 100 is disconnected from the upper seat 2, the fourth mark 272 indicating the unlocked state can be viewed from the second window 20. When the unlocking member 22 is raised, the fourth spring 273 releases compression and elastic force to make the sliding block 27 move in the direction in which the third mark 271 aligns with the second window 20, therefore the third mark 271 indicating the locked state can be viewed from the second window 20 after the top of the door body 100 is connected to the upper seat 2.

Specifically, the base 25 is rotatably sleeved with a collar that surrounds the socket 24, and the outer wall of collar 28 is provided with a driving portion 281 for contacting the limiting portion 222, one end of the first torsion spring 26 is connected to the base 25, the other end is connected to the collar 28 and, the limiting portion 222, when swinging in the direction in which it aligns with the limit groove 251, contacts the driving portion 281 and pushes the collar 28 to pivot, so that the first torsion spring 26 is compressed and maintains the compressed state when the limiting portion 222 inserts into the limiting groove 251; after the limiting portion 222 withdraws from the limit slot 251, the first torsion spring 26 decompresses to release elastic force to pivot the collar 28 and, through the driving portion 281, to push the limiting portion 222 to swing in a direction in which the limiting portion 222 is away from the limiting groove 251.

Specifically, a positioning piece 282 is fixed at a position on the base 25 above the collar 28, and the outer wall of collar 28 is provided with a stopper 283 against the outer wall of the positioning piece 282 to prevent excessive pivot of the collar 28, avoiding the situation where the limiting portion 222 fails to contact with the driving portion 281 to push the collar 28.

Specifically, a swinging member 29 having a fifth guide surface 291 is rotatably installed inside the upper seat 2, and a second torsion spring 292 is also provided to apply elastic force to the swinging member 29 towards the direction in which the end of the swinging member 29 contacts the unlocking member 22;

- the unlocking member 22 is provided with a locking position 223, and the locking position 223 can, with the pivot of the unlocking member 22, swing between the position where it aligns with the end of swinging member 29 and the position where it is away from the end of swinging member 29, and when the limiting portion 222 is aligned with the limiting groove 251 vertically, the end of the swinging member 29 aligns with the locking position 223, and the elastic force applied by the second torsion spring 292 makes the end of the swinging member 29 snap into the locking position 223 to resist the elastic force applied by the first torsion spring 26, maintaining the unlocking member 22 in its current state; when the limiting portion 222 inserts into the limiting groove 251, the unlocking member 22 maintains partial contact with the fifth guide surface 291 to force the swinging member 29 to swing in the direction away from the unlocking member 22, so that causing the end of swinging member 29 moves away from the locking position 223, and the locking position 223 then moves below the end of swinging member 29 along with the unlocking member 22;
- the limiting groove 251 has a relatively large width that allows the limiting portion (222) to swing horizontally and, the limiting portion 222, after inserting into the limiting groove 251, swings under the influence of the elastic force of the first torsion spring 26 to maintain contact with the inner wall of the limiting groove 251, while driving the locking position 223 to move, so that the locking position 223 is away from the end of swinging member 29 and, as the limiting portion 222 withdraws from the limiting groove 251, the locking portion 223 can rise to a position that is on the same horizontal plane as the end of the swinging member 29 but it does not re-engage with the end of the swinging member 29, so that after the first torsion spring 26 releases elastic force, the limiting portion 222 can smoothly swing in the direction away from the limiting groove 251, resetting the locking member 22 and locking portion 223 simultaneously.

Specifically, the upper seat 2 includes a cover and a base, the unlocking member 22 is cap shaped, and a flange 224 that can be in contact with the fifth guide surface 291 is formed at the position on the outer peripheral wall of unlocking member 22 corresponding to the bottom, the locking position 223 is disposed on the flange 224, and the swinging member 29 is also provided with a sixth guide surface 293 that can be in contact with the flange 224 and, when the limiting portion 222 withdraws from the limiting groove 251, the fit between the flange 224 and the sixth guide surface 293 forces the end of swinging member 29 to swing away from the unlocking member 22, and avoid the flange 224 and swinging member 29 coming into contact with each other up and down, which may prevent the limiting portion 222 from exiting the limiting groove 251.

Specifically, the cover body is provided with an avoidance hole 01 that fits the unlocking member 22, the unlocking member 22 that partially passes through the avoidance hole 01 is exposed to the outside, and is prevented from completely passing through the avoidance hole 01 by the limit cooperation between the flange 224 and the inner wall of cover body.

Specifically, the top of unlocking member 22 is provided with a gripping portion 225.

Specifically, the door body 100 is foldable or non foldable, for which reference can be made to the prior art or the following embodiments: the door body 100 is formed by two horizontal bars and two vertical bars that are connected, and the two ends of the horizontal bars are provided with corner seats for connecting with the ends of the vertical bars, one of the corner seats at the two ends of the horizontal bar located at the top of the door body 100 is provided with the first connecting piece 101, and one of the corner seats at the two ends of the horizontal bar located at the bottom of the door body 100 is provided with the second connecting piece 102, and a joint is provided in the middle of the vertical bars, so that the two ends of the vertical bar can swing between the positions where they are close and far away, thereby folding the door body 100.

Specifically, the door body 100 is also covered with soft items.

Specifically, a roller 105 is also provided at the bottom of door body 100 to facilitate the transportation of the door body 100.

It should be noted that the above embodiments all disclose the beneficial effect of side-open doors on both sides in the present invention. In practical applications, the present invention also includes the side-open doors on one side, and the positioning mechanism 200 on one side can be replaced with a door lock.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A side-open safety door railing, including two door bodies that are movably connected to each other, and one of the two door bodies can perform a linear reciprocating motion in a horizontal direction relative to the other one of the two door bodies, so that the two door bodies overlap or are staggered, and one side of each of the two door bodies is detachably and rotatably connected with a positioning mechanism for fixation, so that the two door bodies can swing horizontally to open or close the door;

- wherein the positioning mechanism includes a support rod, an upper seat and a lower seat that are respectively provided at two ends of the support rod;
- the upper seat and the lower seat are detachably connected with a top and a bottom of each of the two door bodies, respectively;
- wherein a bottom of the upper seat and a top of the lower seat are provided with a first connection hole and a second connection hole, respectively,
- the top and bottom of each of the two door bodies are respectively provided with a first connecting piece for movable insertion with the first connection hole and a second connecting piece for movable insertion with the second connection hole, and the first connecting piece can, relative to the two door bodies, move between a position where the first connecting piece inserts into the first connection hole and a position where the first connecting piece withdraws from the first connection hole, and an unlocking member is also provided to drive the first connecting piece to withdraw from the first connection hole to disengage the upper seat from the top of each of the two door bodies.

2. The side-open safety door railing according to claim 1, a first top spring is further provided to apply an elastic force to the first connecting piece in a direction in which the first connecting piece inserts into the first connection hole.

3. The side-open safety door railing according to claim 2, wherein the bottom of the upper seat is provided with a first guide surface for contacting a top of the first connecting piece.

4. The side-open safety door railing according to claim 1, wherein the second connecting piece can, relative to the two door bodies, move between a position where the second connecting piece inserts into the second connection hole and a position where the second connecting piece withdraws from the second connection hole, and a second top spring is also provided to apply an elastic force to the second connecting piece in a direction in which the second connecting piece inserts into the second connection hole.

5. The side-open safety door railing according to claim 4, wherein the top of the lower seat is provided with a second guide surface for contacting a bottom of the second connecting piece.

6. The side-open safety door railing according to claim 5, wherein a movable block is movably provided inside the lower seat, and the movable block can move between a position where the movable block partially extends into the second connection hole and a position where the movable block withdraws from the second connection hole, and a third top spring is provided to apply an elastic force to the movable block to move in a direction in which the movable block partially extends into the second connection hole, a lower end of the second connecting piece is spherical, and the movable block is provided with a third guide surface for contact with a spherical surface.

7. The side-open safety door railing according to claim 1, wherein the positioning mechanism further comprises a sliding seat that is movably sleeved on the support rod.

8. The side-open safety door railing according to claim 1, wherein the upper seat is internally provided with a socket that aligns vertically with the first connection hole, and the unlocking member is provided with a connection shaft for movable insertion with the socket, the unlocking member is rotatably installed on the upper seat through a fit between the connection shaft and the socket and can perform a vertical reciprocating motion along the socket and, the unlocking member, during a downward movement, can contact the first connecting piece through the connection shaft and drive the first connecting piece to move in a direction in which the first connecting piece withdraws from the first connection hole, and the first connecting piece is caused to withdraw from the first connection hole.

9. The side-open safety door railing according to claim 8, wherein the upper seat is internally provided with a base having an insertion hole, the unlocking member has a limiting portion, the base has a limiting groove, and the limiting portion can, with a pivot of the unlocking member, swing between a position where the limiting portion is aligned vertically with the limiting groove and a position where the limiting portion is away from the limiting groove and when the limiting portion is aligned with the limiting groove, the unlocking member can drive the limiting portion to insert into the limiting groove and the first connecting piece is driven to withdraw from the first connection hole, and a first torsion spring is also provided to apply an elastic force to the unlocking member to pivot in a direction in which the limit portion is away from the limiting groove.

10. The side-open safety door railing according to claim 9, wherein the base is rotatably sleeved with a collar that surrounds the socket, and an outer wall of the collar is provided with a driving portion for contacting the limiting portion, one end of the first torsion spring is connected to the base, the other end of the first torsion spring is connected to the collar and, the limiting portion, when swinging in a direction in which the limiting portion aligns with the limit groove, contacts the driving portion and pushes the collar to pivot, so that the first torsion spring is compressed and maintains a compressed state when the limiting portion inserts into the limiting groove; after the limiting portion withdraws from the limit slot, the first torsion spring decompresses to release an elastic force to pivot the collar and, through the driving portion, to push the limiting portion to swing in a direction in which the limiting portion is away from the limiting groove.

11. The side-open safety door railing according to claim 10, wherein a positioning piece is fixed on the base, and the outer wall of the collar is provided with a stopper against an outer wall of the positioning piece to prevent excessive pivot of the collar.

12. The side-open safety door railing according to claim 9, wherein a swinging member having a fifth guide surface is rotatably installed inside the upper seat, and a second torsion spring is also provided to apply an elastic force to the swinging member towards a direction in which one end of the swinging member contacts the unlocking member;

the unlocking member is provided with a locking position, and the locking position can, with the pivot of the unlocking member, swing between a position where the locking position aligns with the end of the swinging member and a position where the locking position is away from the end of the swinging member, and when the limiting portion is aligned with the limiting groove vertically, the end of the swinging member aligns with the locking position, and the elastic force applied by the second torsion spring makes the end of the swinging member snap into the locking position to resist an elastic force applied by the first torsion spring, maintaining the unlocking member in its current state;

when the limiting portion inserts into the limiting groove, the unlocking member maintains partial contact with the fifth guide surface to force the swinging member to swing in a direction away from the unlocking member, so that the end of the swinging member is caused to move away from the locking position, and the locking position then moves along with the unlocking member;

the limiting groove has a width that allows the limiting portion to swing horizontally and, the limiting portion, after inserting into the limiting groove, swings under an influence of an elastic force of the first torsion spring to maintain contact with an inner wall of the limiting groove (251), and the locking position is driven to move, so that the locking position is away from the end of the swinging member.

13. The side-open safety door railing according to claim 12, wherein the upper seat includes a cover and a base, the unlocking member is cap shaped, and a flange that can be in contact with the fifth guide surface is formed at an outer peripheral wall of the unlocking member, the locking position is provided on the flange, and the swinging member is also provided with a sixth guide surface that can be in contact with the flange and, when the limiting portion withdraws from the limiting groove, a fit between the flange and the sixth guide surface causes the end of the swinging member to swing away from the unlocking member.

* * * * *